United States Patent Office 3,700,601
Patented Oct. 24, 1972

3,700,601
COLOR-STABLE LIQUID DETERGENT
CONTAINING DISINFECTANTS
Helmut Bloching, Hilden, Germany, assignor to Henkel
& Cie G.m.b.H., Dusseldorf, Germany
No Drawing. Filed Aug. 14, 1969, Ser. No. 850,228
Claims priority, application Germany, Sept. 11, 1968,
P 17 92 513.2
Int. Cl. C11d 7/54, 3/48, 3/066
U.S. Cl. 252—105                12 Claims

ABSTRACT OF THE DISCLOSURE

Color stable liquid detergents comprising 5 to 40 wt. percent of at least one anionic and/or non-ionic surfactant, 0.1 to 5 wt. percent of at least one substituted diphenyl ether having the formula:

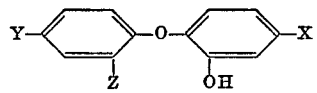

wherein X, Y and Z are chlorine, with the proviso that Y can also be hydrogen, 0.01 to 5 wt. percent referred to the surfactant and disinfectant of at least one water soluble reducing agent and 0.001 to 2%, based on the total solids content present, of an optical brightener. The optical brightening action of said brighteners is not impaired by the presence of the substituted diphenyl ether disinfectant.

This invention relates to color stable liquid washing, rinsing and cleaning agents.

More particularly this invention relates to liquid washing, rinsing and cleaning agents comprising at least one anionic and/or non-ionic surfactant, at least one organic disinfectant, and at least one water-soluble reducing agent.

In accordance with the invention the color stable liquid disinfectant detergent composition which is useful as a washing, rinsing and cleaning agent, comprises 5 to 40% by weight of at least one anionic and/or non-ionic surfactant, 0.1 to 5% by weight of at least one substituted diphenyl ether organic disinfectant of the formula:

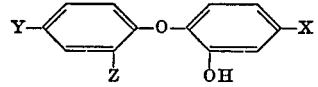

wherein X, Y and Z each represent chlorine or bromine, and wherein Y or Z can also be hydrogen, and a water-soluble reducing agent in an amount of 0.01 to 5% of weight of the surfactant and disinfectant mixture. Instances of substituted diphenyl ethers of the above formula include, for example, 2-hydroxy-2',4-dichlorodiphenylether, 2-hydroxy-2',4-dibromodiphenylether, and preferably 2-hydroxy-2',4,4'-trichlorodiphenylether. In addition to these components, the following substances may also be present:

0 to 20% preferably 10 to 15% by weight of solubilizers;
0 to 35% preferably 0 to 15% by weight of water-soluble anyhdrous phosphates and/or other known complexing agents;
0 to 3% preferably 0 to 0.5% by weight of clouding agents, such as polystyrene, ethylene glycol distearate, etc.

In addition, small amounts of buffers, perfumes, preservatives and dyestuffs can be incorporated. If the liquid detergents are to be used as textile washing detergents, their surfactants content can be increased to about 60% by weight. It has also been found to be particularly advantageous to add 0.001 to 2%, and preferably 0.01 to 1% of the solid weight of conventional optical brighteners for cellulose fibers and synthetic fibers, as for example, derivatives of 4,4'-diaminostilbene disulfonic acid, 1,3-aryl substituted pyrazolines, brighteners on the basis of coumarins, carbostyril, benzoxazole for example, 2,2'-bisbenzoxazolethiophene, benzimidazole, and the like as the disinfectants in accordance with the invention are inert to the brighteners. Brightener-free textile detergents having a content, for example, of 2-hydroxy-2',4,4'-trichlorodiphenylether, are accordingly particularly well suited for the washing of textiles which have been treated with optical brightening agents, since they do not appreciably impair the action of the brighteners.

Examples of conventional optical brighteners are, for instance, compounds of the diaminostilbenesulfonic acid derivative type having the following formula:

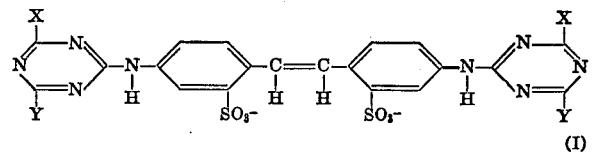

wherein X and Y which may be the same or different can be $NH_2$, $NH-CH_3$ $NH-CH_2-CH_2-OH$, $CH_3-N-CH_2-CH_2OH$, $N(CH_2-CH_2OH)_2$ morpholino, dimethylmorpholino, $NH-C_6H_5$, $NH-C_6H_4-SO_3H$ $OCH_3$, and Cl.

Furthermore, optical brighteners of the diarylpyrazoline type, having the following formula, may be used with the compositions of the invention:

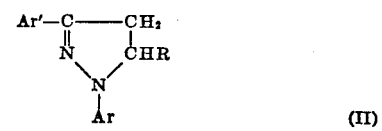

wherein R represents hydrogen, alkyl or aryl, which can be substituted and Ar and Ar' each represent aryl such as phenyl, diphenyl or naphthyl, which may be substituted by hydroxy, alkoxy, hydroxyalkyl, amino, alkylamino, acylamino, carboxyl, sulfonic acid or sulfonamide groups, or halogen atoms. 1,3-diarylpyrazolines in which R represents a hydrogen atom, are used preferentially.

As noted above, the surfactant may be non-ionic or anionic in character. Anionic surfactants are in general within the scope of this invention. Illustrative of the types of anionic surfactants included herein, are those having at least one hydrophobic group of about 8 to 24 carbon atoms, generally in an aliphatic or alicyclic configuration. It is within the spirit and scope of this invention to utilize either saturated or unsaturated hydrophobic groups, e.g. octyl, octenyl, dodecyl, oleyl, stearyl, cyclodecenyl, linolenyl, nonadecyl, cyclododecatrienyl, palmityl, cyclooctyl, cyclohexyl-decyl, etc. The hydrophobic group is suitably joined to an anionic water-solubilizing group, either directly or via an intermediate or bridging group. Where a bridging group is used, it may for example be a benzene ring, a carboxylic acid ester, a carbon amide or an alkylene glycol group, e.g. ethylene or propylene glycol.

As anionic wash-active substances, there can be used soaps derived from natural or synthetic fatty acids, and possibly also from resin and naphthenic acids. Among the best known synthetic anionic surfactants are the sulfonates, for instance the alkylaryl sulfonates and particularly alkyl benzene sulfonates having about 9–15 carbon atoms in the alkyl radical. There are primarily of interest aliphatic surfactants such as can be formed from preferably saturated hydrocarbons containing about 9 to 15 carbon atoms in the molecule by sulfochlorination with sulfur dioxide and chlorine, or sulfoxidation with sulfur dioxide and oxygen and conversion of the resultant intermediate products into the sulfonates in the conventional manner. In the sulfonates prepared in this manner, the sulfonate group is usually on a secondary carbon atom; however, there can also be used aliphatic sulfonates obtained by known methods whose sulfonate group is on a primary carbon atom. As aliphatic sulfonates there can, furthermore, be employed products which can be obtained by sulfonation with sulfur trioxide of terminal or non-terminal $C_9$–$C_{15}$ olefins. The sulfonates which are to be used in accordance with the invention also include the esters of $\alpha$-sulfo fatty acids with monohydric or polyhydric alcohols containing 1 to 4 and preferably 1 to 2 carbon atoms.

As anionic surfactants of the sulfate type, there may be mentioned fatty alcohol sulfates, sulfated fatty acid alkylolamides, sulfated fatty acid monoglycerides and the sulfonation products of ethoxylated and/or propoxylated fatty alcohols, alkyl phenols having about 8 to 15 carbon atoms in the alkyl radical, fatty acid amides, fatty acid alkylolamides, etc., about 1 to 8, and preferably about 2 to 4, glycol ether groups being possibly present in a molecule. Sulfonation products of the sulfate type which can be used in the invention can also be prepared from terminal or non-terminal $C_9$–$C_{15}$ olefins.

As non-ionic surfactants, there are preferred the addition products of akyleneoxide, e.g. ethylene oxide, propylene oxide and/or the addition products of ethylene oxide and propylene oxide, to fatty alcohols, fatty acids, alkyl phenols, fatty acid amides, fatty acid alkylolamides and similar compounds having at least one reactive hydrogen atom. The number of glycol units present in the molecule can vary between about 4 and 20, and preferably about 5 to 15, and should be sufficient to impart to the products cloud points of at least about 20° C. Amine oxides are also included here among the non-ionic surfactants.

The foaming power of the preparations of the invention can be increased or reduced by suitable combinations of different wash-active substances. When desired, foam stabilizing or foam inhibitors can also be added. In general, importance is placed on good foaming power in the case of hand dishwashing agents used in the household; in the case of dishwashing agents for commercial or industrial purposes, or for dishwashing machines including those used in the household, a low production of foam is generally desired. As foam stabilizers there are particularly suited the well-known fatty acid alkylolamides and particularly the fatty acid monoethanol amides. As foam inhibitors, there can be used inter-alia addition products of propylene oxide to the non-ionic polyethylene glycol ethers described above.

Insofar as the anionic or non-ionic surfactants are derived from fatty acids or fatty alcohols, they can preferably contain 12 to 14 carbon atoms per fatty acid or fatty alcohol radical.

As water-soluble reducing agents to be used in accordance with the invention, there enter into consideration water-soluble inorganic reductive nitrogen compounds such as salts of hydrazine or hydroxylamine, for example, hydrazinium sulfate or hydroxyl ammonium chloride, or water-soluble salts of reductive acids of sulfur or of phosphorus, e.g. sodium dithionite, sodium sulfite, sodium pyrosulfite, sodium thiosulfate, sodium hypophosphite and sodium hydroxymethane sulfinate.

In order to improve the homogeneity of the combination compositions of this invention, hydrotropic substances and/or sedimentation stabilizers may be added thereto. As hydrotropic substances, water-soluble organic solvents having boiling points of at least 70° C., such as the aliphatic mono-alcohols having about 2 to 4 carbon atoms as well as ether alcohols having about 3 to 10 carbon atoms, for instance the mono-ethers of mono-, di- or triethylene glycol with methyl, ethyl, propyl or butyl alcohols, as well as water-soluble partial ethers of said monohydric alcohols with glycerin, di-glycerin or tri-glycerin, etc., have been found to be useful. There can also be used lower aromatic sulfonates such as benzene, toluene, xylene or naphthalene sulfonate. Urea can also be used as hydrotropic substance.

Stability upon storage and, in particular, sedimentation stability, can be obtained where required by incorporating water-soluble thickening agents. These include, for instance, salts of polyacrylic acid or polymethacrylic acid.

The compositions of this invention can also contain phosphates such as pyro- and tripolyphosphates. These phosphates can be replaced in whole or in part by other complexing agents, such as the salts of nitrilotriacetic acid or ethylene diaminotetra-acetic acid. The quantity of these phosphates and/or complexing agents depends on the field of use; cleaning agents for surfaces of solid materials, particularly for dishwashing agents, frequently contain only such quantities of phosphates and/or other complexing agents as dissolve in the aqueous phase. In the case of fine washing agents or other textile washing agents on the other hand, it is advisable to incorporate larger quantities of phosphates and/or other complexing agents which are then to be sure suspended as undissolved components.

This invention is still further illustrated, by the following examples, which are not to be construed in any way or manner as imposing limitations upon the scope thereof.

Unless otherwise expressly indicated, the salt form components mentioned in the following formulations are sodium salts.

EXAMPLE 1

A liquid rinsing agent was prepared formulated as follows:

5.0% by weight lauryl sulfate
5.0% by weight myristyl sulfate
8.0% by weight of an addition product of 8 mols of ethylene oxide to 1 mol of fatty acid monoethanolamide (14 to 20 carbon atoms in the fatty acid radical)
0.0004% by weight of the red dyestuff rhodamin B
10.0% by weight isopropanol
0.05% by weight perfume
2.0% by weight 2-hydroxy-2',4,4'-trichlorodiphenylether
0.5% by weight sodium sulfite
Balance—water.

Even after four weeks of storage under the influence of sunlight and bright daylight, this detergent retained its clear, bright red color. When the sulfite was not included at the time of preparation, the color of the detergent composition turned to dirty gray after only one week.

EXAMPLE 2

A mild liquid detergent was prepared having the following composition:

| | Percent by weight |
|---|---|
| Straight-chained dodecylbenzenesulfonate | 10.0 |
| Oleyl alcohol, etherified with 10 mols of ethylene oxide | 10.0 |
| Ethanol | 5.0 |
| Coconut fatty acid diethanolamide (8 to 18 carbon atoms in the fatty acid radical) | 5.0 |
| 2-hydroxy-2',4,4'-trichlorodiphenylether | 0.7 |
| 2-hydroxylamine sulfate | 0.18 |
| Perfume | 0.1 |
| Cotton brightener corresponding to Formula I, wherein X represents the radical NH—$C_6H_5$ and Y represents the morpholine ring (undiluted) | 0.25 |
| Formaldehyde | 0.0 to 0.2 |
| Ethylenediaminetetraacetate | 0.2 |
| Potassium toluenesulfonate | 10.0 |

Following prolonged storage under the conditions as set out in Example 1, this detergent remained colorless, whereas when hydroxylamine sulfate was not added at the time of preparation, a strong brown discoloration took place, which made the preparation unattractive. Hydroxylamine sulfate also has a preservative effect.

EXAMPLE 3

A mild liquid detergent was prepared having the same composition as in Example 2, but using 0.1% of undiluted polyamide fiber brightener corresponding to Formula II in place of the 0.25% cotton brightener. In this Formula II brightener R designated hydrogen, Ar the phenylsulfonamide radical, and Ar' the p-chlorophenyl radical. The performance of this preparation as regards stability of color was the same as that of Example 2.

Samples of a commercial fabric made from polyamide fibers (Perlon®) and samples made from undyed cotton were washed in enameled vessels for 20 minutes at 60° C. using the mild liquid detergents of Examples 2 and 3. The concentration of the liquid washing agent amounted to 4.5 g. per liter, and the laundry ratio (kg. of laundry per liter of wash water) amounted to 1:40. The tap water used had a hardness of 16° dH. In comparison test, addition fabric samples were washed with a disinfectant-free mild liquid detergent otherwise analogous to those of Examples 2 and 3.

After twenty washings in each case, the "dulling action" of the detergents with reference to the optical brighteners was determined on the basis of the whiteness of the dried samples as measured with a photometer (Carl Zeiss "Elrepho" Photometer), in which connection three different color filters were used in order to assure a spectral distribution similar to daylight according to DIN 5033. The measurement of the degree of whiteness W was carried out according to the formula proposed by A. Berger ("Die Farbe," 8 (1959), pp. 187 to 201) as follows:

$$W = R_y + 3(R_z - R_x)$$

wherein $R_x$ represents the reflectivity measured with the red filter FMX/C, $R_y$ the reflectivity with the green filter FMY/C, $R_z$ the reflectivity with the blue filter FMZ/C.

Magnesium oxide having a value of R=100 was used as the calibrating substance. The value W which was obtained in this manner was substantially in agreement with the physiological impression of brightness, particularly since even a light yellow tint which is clearly perceptible to the eye can be estimated quantitatively. In the formerly conventional photometric measurement procedures using an ordinary daylight filter, such a yellow tint produced no measurable loss of brightness and hence no reproducible reading on the photometer.

As can be seen from the following table, the brightener action produced in the samples washed with the mild detergent according to the invention was hardly affected as compared with the samples washed with the mild detergent that contained no disinfectant.

TABLE

| | Cotton fabric (Brightener Type Ic) | Polyamide fabric (Brightener Type II) |
|---|---|---|
| Detergent | WHITENESS | |
| No disinfectant; otherwise like Example 2 | 182.6 | 164.9 |
| Disinfectant 2-hydroxy-2',4,4'-trichlorodiphenylether, per Example 2. | 180.8 | 160.1 |

Pieces of cotton or synthetic fabrics that had been treated by finishing with brighteners remained unaffected as regards their whiteness effect when they were washed with detergents containing no brightening agents, but containing 2-hydroxy-2',4,4'-trichlorodiphenylether as a disinfectant according to the invention.

The preparations in accordance with the invention are used in the form of aqueous solutions which contain:

About 5 to 40% by weight and preferably about 10 to 35% by weight of anionic and/or non-ionic surfactants;

About 0.1 to 5% by weight and preferably about 0.1 to 2% by weight of disinfectants;

About 0.01 to 5% by weight and preferably about 0.1 to 2.5% by weight of reduction agents;

each based upon the mixture of surfactants and disinfectants. In addition to this, there may also be present the following materials:

Up to about 20% by weight and preferably about 10 to 15% by weight of solubilizers;

Up to about 35% by weight and preferably up to about 15% by weight of water-soluble anhydrous phosphates and/or other complexing agents;

Up to about 3% by weight and preferably up to about 0.5% by weight of clouding agents, such as polystyrene, ethylene glycol distearate, etc.

In addition, smaller quantities of buffer substances, fragrances, preservatives, coloring substances, etc., can be incorporated.

I claim:

1. A liquid detergent composition consisting essentially of about 5–40% of at least one surfactant selected from the group consisting of anionic and non-ionic surfactants, about 0.1 to 5 wt.-percent of at least one substituted diphenylether disinfectant is selected from the group consisting of 2-hydroxy-2',4-dichlorodiphenylether and 2-hydroxy-2',4,4'-trichlorodiphenylether, 0.001 to 2 wt.-percent based on the total solids present, of an optical brightener selected from the group consisting of

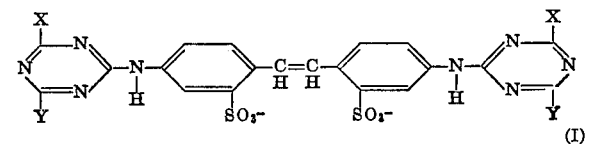

and

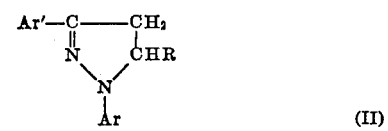

wherein

X and Y each represents a member selected from the group consisting of $NH_2$, $NH-CH_3$, $$NH-CH_2-CHOH$$

$CH_3-N-CH_2-CH_2OH$, $N(CH_2-CH_2OH)_2$, morpholino, dimethylmorpholino, $NH-C_6H_5$, $$NH-C_6H_4-SO_3$$

$OCH_3$ and Cl,

R represents a member selected from the group consisting of hydrogen, alkyl and aryl, and Ar and Ar' each represents a member selected from the group consisting of substituted and unsubstituted aryl, wherein said substituent is a member selected from the group consisting of hydroxy, alkoxy, hydroxyalkyl, amino, alkylamino, acylamino, carboxyl, sulfonyl, sulfonamido and halogen.

2. A liquid detergent composition according to claim 1 wherein said surfactant is present in an amount of about 10 to 35 wt.-percent, said disinfectant is present in an amount of about 0.1 to 2 wt.-percent and said reducing agent is present in an amount of about 0.1 to 2.5 wt.-percent.

3. A liquid detergent composition according to claim 1 wherein said composition additionally contains up to about 20 wt.-percent of a solubilizer, selected from the group consisting of lower molecular weight alkyl aromatic sulfonates, water-soluble organic solvents having a boiling point of at least 70° C. and urea up to about 35 wt.-percent of a complexing agent, selected from the group consisting of water-soluble condensed phosphates, nitrilotriacetates and ethylenediaminetetra-acetates and up to about 3 wt.-percent of at least one clouding agent selected from the group consisting of polystyrene and ethylene glycol distearate.

4. A liquid detergent composition according to claim 1 wherein said disinfectant is 2-hydroxy-2',4,4'-trichlorodiphenylether.

5. A liquid detergent composition according to claim 1 wherein said optical brightener corresponds to the following formula:

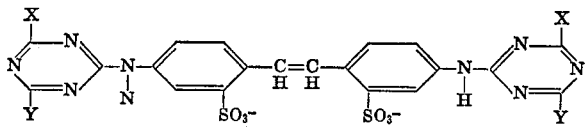

wherein X and Y each represent a member selected from the group consisting of

—NH₂, —NH—CH₃, —NH—CH₂—CHOH

CH₃—N—CH₂—CH₂OH, —N(CH₂—CH₂OH)₂ morpholino, dimethylmorpholino, —NH—C₆H₅,

—NH—C₆H₄—SO₃

—OCH₃ and —Cl.

6. A liquid detergent composition according to claim 1 wherein said optical brightener corresponds to the following formula:

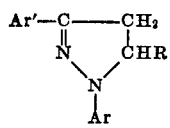

wherein R represents a member selected from the group consisting of hydrogen, alkyl and aryl and Ar and Ar' each represent a member selected from the group consisting of substituted and unsubstituted aryl, wherein said substituent is a member selected from the group consisting of hydroxy, alkoxy, hydroxyalkyl, amino, alkylamino, acylamino, carboxyl, sulfonyl, sulfonamido and halogen.

7. A liquid detergent composition according to claim 1 consisting essentially of:
   5.0% by weight lauryl sulfate
   5.0% by weight myristyl sulfate
   8.0% by weight of an addition product of 8 mols of ethylene oxide to 1 mol of fatty acid monoethanolamide (14 to 20 carbon atoms in the fatty acid radical)
   0.0004% by weight of the red dyestuff rhodamin B
   10.0% by weight isopropanol
   0.05% by weight perfume
   2.0% by weight 2-hydroxy-2',4,4'-trichlorodiphenylether
   0.5% by weight sodium sulfite
   Balance—water.

8. A liquid detergent composition according to claim 1 consisting essentially of:

| | Percent by weight |
|---|---|
| Straight-chained dodecylbenzenesulfonate | 10.0 |
| Oleyl alcohol, etherified with 10 mols of ethylene oxide | 10.0 |
| Ethanol | 5.0 |
| Coconut fatty acid diethanolamide (8 to 18 carbon atoms in the fatty acid radical) | 5.0 |
| 2-hydroxy-2',4,4'-trichlorodiphenylether | 0.7 |
| 2-hydroxylamine sulfate | 0.18 |
| Perfume | 0.1 |
| Cotton brightener corresponding to Formula I wherein X represents the radical NH—C₆H₅ and Y represents the morpholine ring | 0.25 |
| Formaldehyde | 0.0 to 0.2 |
| Ethylenediaminetetraacetate | 0.2 |
| Potassium toluenesulfonate and the balance, water | 10.0 |

9. A liquid detergent composition according to claim 1 consisting essentially of:

| | Percent by weight |
|---|---|
| Straight-chained dodecylbenzenesulfonate | 10.0 |
| Oleyl alcohol, etherified with 10 mols of ethylene oxide | 10.0 |
| Ethanol | 5.0 |
| Coconut fatty acid diethanolamide (8 to 18 carbon atoms in the fatty acid radical) | 5.0 |
| 2-hydroxy-2',4,4'-trichlorodiphenylether | 0.7 |
| 2-hydroxylamine sulfate | 0.18 |
| Perfume | 0.1 |
| Polyamide fiber brightener corresponding to Formula II wherein R is hydrogen, Ar is phenylsulfonamido and Ar' is p-chlorophenyl | 0.1 |
| Formaldehyde | 0.0 to 0.2 |
| Ethylenediaminetetraacetate | 0.2 |
| Potassium toluenesulfonate and the balance, water | 10.0 |

10. The process which comprises laundering a textile fabric in the presence of an optical brightening agent selected from the group consisting of

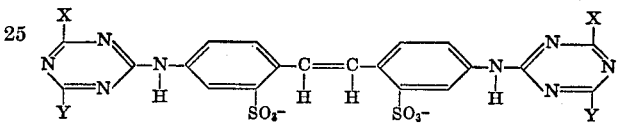

and

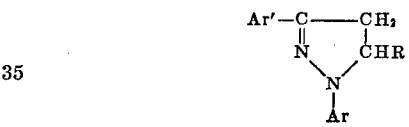

wherein
X and Y each represents a member selected from the group consisting of —NH₂, —NH—CH₃,

—NH—CH₂—CHOH

CH₃—N—CH₂—CH₂OH, N(CH₂—CH₂OH)₂ morpholino, dimethylmorpholino, —NH—C₆H₅,

—NH—C₆H₄—SO₃

—OCH₃ and —Cl,

R represents a member selected from the group consisting of hydrogen, alkyl and aryl, and
Ar and Ar' each represents a member selected from the group consisting of substituted and unsubstituted aryl, wherein said substituent is a member selected from the group consisting of hydroxy, alkoxy, hydroxyalkyl, amino, alkylamino, acylamino, carboxyl, sulfonyl, sulfonamido and halogen, with a liquid detergent composition consisting essentially of about 5 to 40% of at least one surfactant selected from the group consisting of anionic and non-ionic surfactants, about 0.1 to 5 wt.-percent of at least one substituted diphenylether disinfectant selected from the group consisting of 2-hydroxy-2',4-dichlorodiphenylether and 2-hydroxy-2',4,4'-trichlorodiphenylether, and about 0.01 to 5 wt.-percent of the surfactant and disinfectant of a water-soluble inorganic reducing agent selected from the group consisting of hydrazine sulfate, hydroxylamine hydrochloride, sodium dithionite, sodium sulfite, sodium pyrosulfite, sodium thiosulfate, sodium hypophosphite and sodium hydroxymethanesulfinate.

11. The process of claim 10 wherein said optical brightening agent is present in the detergent composition to the extent of 0.001 to 2 wt.-percent based on the total solids content thereof.

12. The process of claim 10 wherein said optical brightening agent is present in the textile fabric being laundered.

References Cited
UNITED STATES PATENTS

| | | | |
|---|---|---|---|
| 2,921,907 | 1/1960 | Kleyn | 252—107 |
| 3,135,742 | 6/1964 | Wagner et al. | 260—239.9 |
| 3,177,207 | 4/1965 | Siegel et al. | 260—240 |
| 3,284,362 | 11/1966 | Zussman | 252—107 |
| 3,503,885 | 3/1970 | Wedell | 252—105 |

OTHER REFERENCES

Condensed Chem. Dictionary, fifth ed., Reinhold Publishing Corp., 1956, p. 498.

LEON D. ROSDOL, Primary Examiner

P. E. WILLIS, Assistant Examiner

U.S. Cl. X.R.

252—106, 107, 524, 544